Aug. 8, 1939.  S. C. SHIPLEY  2,169,168
DAMPER REGULATOR
Filed Feb. 24, 1936  2 Sheets—Sheet 1

Inventor
Sylvanus C Shipley
By George H Fisher
Attorney

Aug. 8, 1939.  S. C. SHIPLEY  2,169,168
DAMPER REGULATOR
Filed Feb. 24, 1936  2 Sheets—Sheet 2
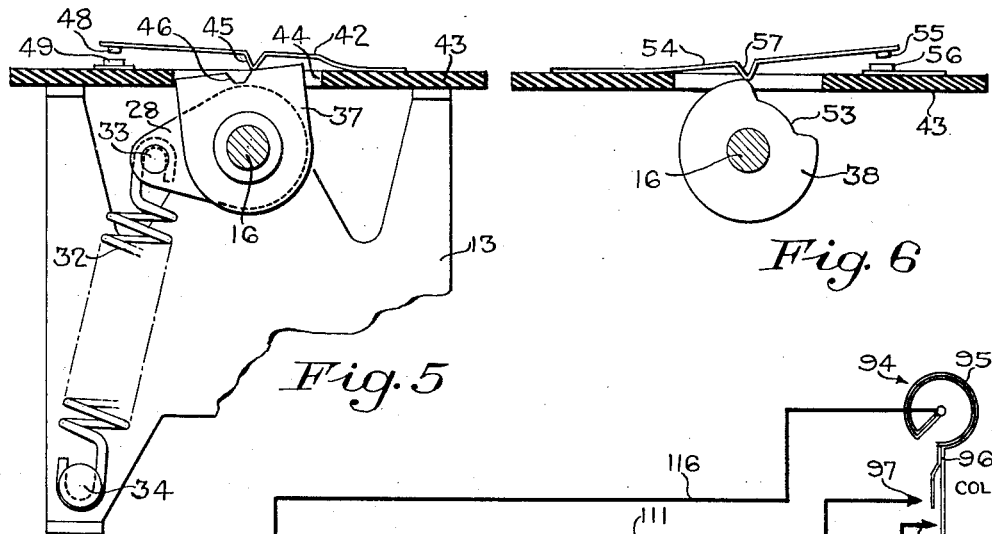
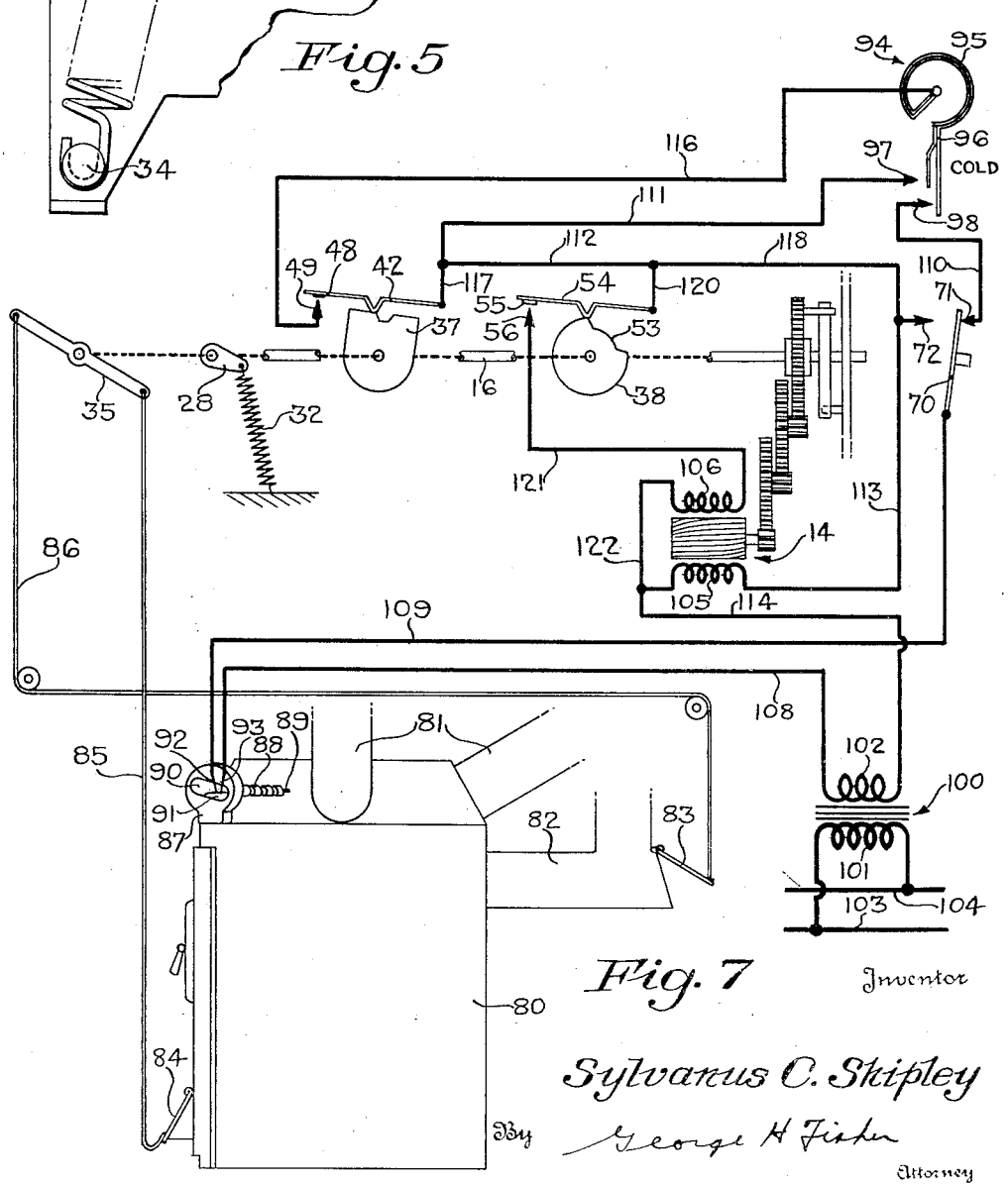
Fig. 5
Fig. 6
Fig. 7
Inventor
Sylvanus C. Shipley
By George H. Fisher
Attorney Patented Aug. 8, 1939

2,169,168

UNITED STATES PATENT OFFICE 2,169,168

DAMPER REGULATOR

Sylvanus C. Shipley, Minneapolis, Minn., assignor to Minneapolis-Honeywell Regulator Company, Minneapolis, Minn., a corporation of Delaware Application February 24, 1936, Serial No. 65,274

12 Claims. (Cl. 236—9)

My invention relates to a damper regulator and more particularly to one normally automatically controlled but having means for manually operating the same when desired. In systems for the automatic control of furnace dampers it is common to employ a damper motor for actuating the dampers, which damper motor is under the control of a room thermostat. In such systems the dampers are usually moved from a position wherein the check damper is open and the draft damper is closed, to a position in which the opposite situation exists, depending upon whether the temperature in the room or other space to be heated is above or below the desired value. The operating connection between the damper motor and the dampers quite commonly consists of a damper arm secured to a shaft driven by the motor, the opposite ends of the damper arm being connected through chains or similar devices to the respective dampers.

Two general types of motors are employed in such devices. In one type of motor the motor is operated continuously and the dampers are moved between their two extreme positions upon such continuous rotation of the motor. In the other general type of motor, the motor is operated so as to move the dampers to one position and when it is desired to move the dampers to the other position the motor is deenergized and the shaft to which the damper arm is connected is rotated in the reverse direction by some suitable motor means which is usually a spring. The latter type of motor has a distinct advantage in that in the event of a power failure, the dampers are inevitably returned to the position which they assume when the motor is deenergized, which position can conveniently be the draft retarding position.

While various devices have been provided with damper motors of the first type for manually causing movement of the dampers to an intermediate firing position, no such provision has been made in motors of the second type. While manual control means have been provided in one of such motors for moving the dampers to a draft producing condition for firing purposes, this is not always desirable in certain types of furnaces. In many furnaces it is imperative that the dampers both be closed in order to prevent smoke and other fumes from issuing from the fire door during the firing operation. Moreover, the previous means for manually causing the dampers to be moved to a draft producing condition for firing with this second type of motor has had the disadvantage of being excessively complicated adding both to the cost and the danger of the device being rendered inoperative. My invention is particularly concerned with providing a manually controlled means for a damper motor of the second type which is commonly referred to as a "stalled motor" type, which means is capable of causing movement of the dampers to a mid-position.

An object of the present invention is, accordingly, to provide a manually controlled means for a damper motor of the "stalled motor" type for moving the dampers to mid-position.

A further object of the present invention is to provide a damper motor of the "stalled motor" type having a manually controlled stop for stalling the motor in an intermediate position desired for firing.

A further object of the present invention is to provide a damper motor of the "stalled motor" type having a stop for stalling the motor in an intermediate position and means for causing the motor to be either energized sufficiently to move it to a position where it can be stalled against such stop, or to be energized to run up against such stop.

A further object of the present invention is to provide a damper control system in which manually controlled means are provided for running the dampers to a mid-position and in which said dampers may be returned to their normal position either by being released by said manually controlled means or by the furnace temperature rising sufficiently to cause the motor circuit to be interrupted by the limit control.

Other objects of the invention will be apparent from the accompanying specification, claims and drawings, of which:

Figure 1:
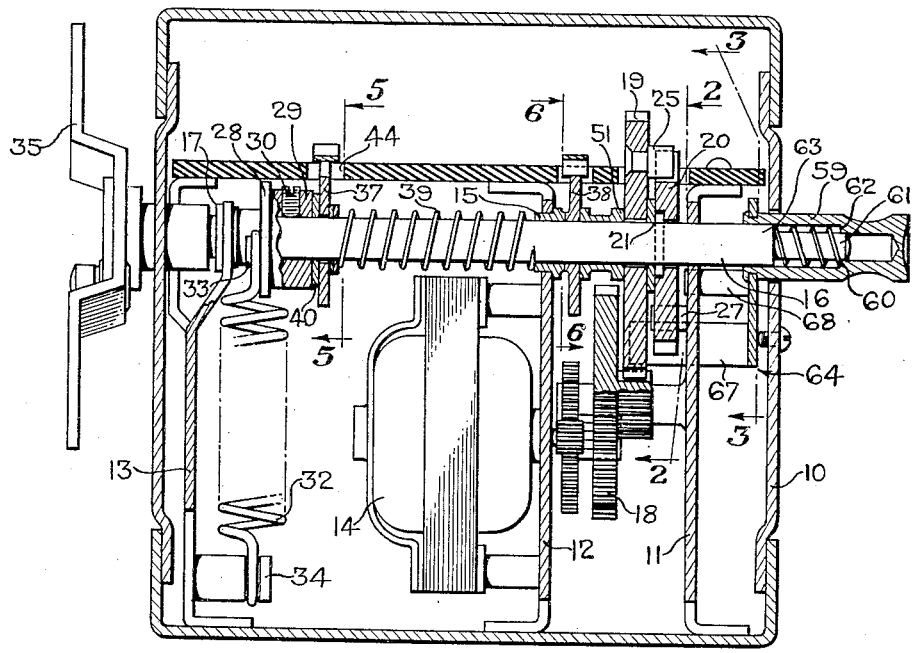
Figure 1 is a section of my improved damper motor.
Figure 4:
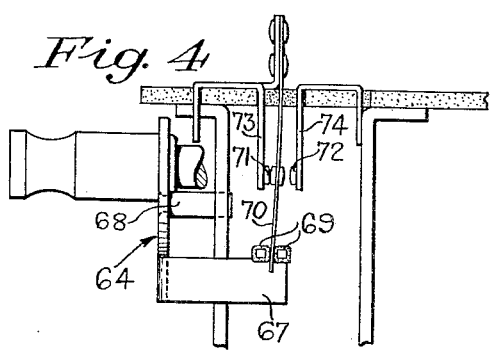
Figure 3:
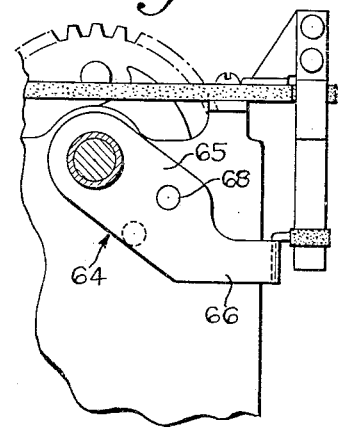

Figure 3 is a section of a portion of the damper motor taken along the line 3—3 of Figure 1, Figure 4 is a view of the detail of my damper motor looking in a direction opposite to that from which Figure 1 is viewed, Figure 5 is a section of a portion of my damper motor along the line 5—5 of Figure 1 looking in the direction of the arrows adjacent said line, Figure 6 is a section of the damper motor along the line 6—6 of Figure 1 and in the direction of the arrows thereon, and Figure 7 is a schematic showing of my damper motor employed in a damper regulating system.

Referring to Figure 1 of the drawings, the damper motor is shown as located within a housing 10. Attached to the bottom wall of said housing are three vertical plate members 11, 12 and 13. These plate members serve to support the various apparatus of the damper motor. Secured to plate 12 is the motor 14 which may be of any desired type, with the exception of the field windings, which will be described in more detail later. Rotatably mounted within plate 12 is a bearing sleeve 15 secured to shaft 16. Rotatably mounted within plate 13 is a second bearing sleeve 17 secured to shaft 16 so that the shaft 16 is rotatably supported in the two plates 12 and 13.

Figure 2:
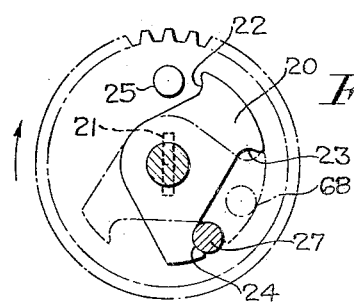
Figure 2 is a sectional view taken along the line 2—2 of Figure 1.

The motor 14 is connected through a suitable reduction gearing 18 with a gear 19 which is freely rotatable with respect to the shaft 16. Attached to the shaft 16 is an irregularly shaped plate 20. The plate 20 is non-rotatably secured to the shaft 16 by means of a key 21. As shown most clearly in Figure 2, the plate 20 is provided with curved shoulders 22, 23 and 24. The gear 19 is provided with a projecting pin 25, which upon energization of the motor and the resultant rotation of the gear 19 in a clockwise direction looking from the right of Figure 1 engages the plate 20 to cause rotation thereof and of shaft 16 to which it is attached. Projecting from the plate 11 is a stop 27 which stop is designed to engage with the curved shoulder 23 and to limit the rotation of plate 20 and the consequent rotation of shaft 16.

Non-rotatably attached to shaft 16 is a crank arm 28. The arm 28 is secured to a hub member 29 which in turn is secured to the shaft by means of a set screw 30. As shown most clearly in Figure 5, a coil spring 32 has one end connected to the crank arm 28 through engagement with a pin 33. The other end of the spring 32 is hooked over a pin 34 rigidly secured to the plate 13. The spring 32 normally urges the shaft in a direction opposite to that in which it is driven by the motor. This motion of the shaft by spring 32 is limited by the stop 27 engaging the curved shoulder 24 of the plate 20 so that when the motor is deenergized the plate 20 is in the position shown in full lines in Figure 2. Thus, shaft 16 is rotated through approximately 60 degrees, being rotated from the position wherein plate 20 is in the position indicated in full lines in Figure 2 to the position wherein the curved shoulder 23 is moved into engagement with the stop 27, as indicated in dotted lines in Figure 2. The shaft remains in this position with the pin 27 serving to prevent any further rotation of shaft 16 by the motor. As soon as the motor is deenergized the spring 32 is effective to rotate the shaft in a counter-clockwise direction until the pin 27 again engages with the curved shoulder 24.

Attached to the end of shaft 16 is a crank arm 35 which serves as a damper arm. Carried by the shaft are two switch actuating cams 37 and 38. Cam 37 is mounted for frictional rotation on the shaft 16 and is held against too free rotation by means of a spring 39 which spring causes the cam 37 to be pressed against a friction washer 40 interposed between the cam and the hub 29. The shape of this cam 27 is most clearly shown in Figure 5. As indicated in that figure, the cam is adapted to cooperate with a switch arm 42, which switch arm is mounted on a plate of insulating material 43 which is supported upon plates 11, 12 and 13. The rotation of cam 37 is limited by reason of the sides of the cam engaging the edges of the opening 44 of insulating plate 43 through which it extends. Upon rotation of shaft 16 in a clockwise direction cam 37 is rotated until it engages with the right-hand side of the opening 44. Further rotation of the shaft 16 results in the cam 37 merely slipping on the shaft so that the cam 37 is not again moved until the shaft is rotated in the opposite direction. The slight initial rotation of the cam 37 is sufficient, however, to permit the cam follower 45 of switch blade 42 to move within the recessed portion 46 of the cam 37 so as to permit the switch blade 42 to cause the engagement of a movable contact 48 carried by the same with a fixed contact 49 carried by the insulating plate 43. It will, accordingly, be seen that in the position shown in Figure 5, which position corresponds to the position assumed when motor 14 is deenergized, contacts 48 and 49 are separated but that upon rotation of shaft 16 in a clockwise direction due to the energization of the motor engagement of these contacts will be almost immediately effected and will continue while the shaft 16 is rotated as far as it goes in a clockwise direction. Moreover, as soon as the motor is deenergized so that the shaft is rotated by spring 32 in a counter-clockwise direction, the switch blade 42 will be almost immediately raised causing the separation of contacts 48 and 49. This switch functions to provide a holding circuit for the motor, as will be more apparent from a subsequent description of the operation of my device.

The cam 38 is rigidly secured to shaft 16 being held between the bearing sleeve 15 and a sleeve 51. The shape of this cam is indicated in Figure 6, which figure discloses a view looking from the left of Figure 1. In the following description of the operation of this cam it must be, accordingly, borne in mind that this cam is viewed in the direction opposite to that from which Figure 5 is viewed, and, accordingly, the rotation previously described as counter-clockwise, appears in this figure to be clockwise. As shown in Figure 6 the cam is provided with an elongated heel portion 53 which heel portion is slightly less in angular extent than the normal rotation of shaft 16. Cooperating with the cam 38 is a switch blade 54 which carries a contact 55 adapted to be engaged with a stationary contact 56 mounted on the insulated plate 43. In the position shown in Figure 6, which position is that assumed when the motor is deenergized, the contacts 55 and 56 are separated by reason of the cam follower 57 of the switch blade 54 resting on the toe portion of cam 38. Upon the first initial rotation of shaft 16 due to the energization of the motor, which rotation will appear to be in a counter-clockwise direction in this figure, the cam 57 will be allowed to ride down onto the heel 53 of the cam 38 permitting engagement of contacts 55 and 56. As indicated previously, the heel 53 is slightly less in angular extent than the rotation of shaft 16 so that before shaft 16 has rotated to the point where such rotation is stopped by reason of pin 27 engaging with the curved shoulder 23 of plate 20 the cam follower 57 will ride up off of the heel 53 riding on to the toe portion again so that contacts 55 and 56 are again separated. The purpose of this switch is to permit the use of two field coils for motor 14, one of which serves as the lifting coil and the other of which serves as the holding coil. As will be more apparent from the description of the operation of my system, only the holding coil is energized when contacts 55 and 56 are separated so that the holding coil is initially the only one which is effective. After a very slight initial rotation of shaft 16 the lifting coil is brought into the circuit by reason of the closure of contacts 55 and 56 and this lifting coil remains in the circuit until the shaft has almost reached the limit of its travel, whereupon it is again cut out so that only the holding coil is effective to hold the shaft in its "stalled" position. The use of these two windings, as will be more apparent from the subsequent description, permits a gradual initial movement, a rather powerful lifting movement and the use of a holding force which, while sufficient to retain the device in its "stalled" position does not consume such an excessive amount of energy as to cause over-heating of the motor.

Slidably mounted on the end of the shaft 16 is a knob 59. This knob 59 is normally urged outwardly by a spring 60 which surrounds a reduced extension 61 of shaft 16 and engages at one end an internal shoulder 62 of knob 59 and at the other end a shoulder 63 of shaft 16 formed by reason of the reduced portion 61. Secured to the inner end of knob 59 is an arm 64. This arm, as shown in Figures 3 and 4, consists of a diagonally extending portion 65 which terminates in a horizontally extending portion 66 which is bent at right angles to provide an extension 67 extending parallel to the shaft 16. Mounted on the arm 64 is a pin 68. Upon inward movement of knob 59, the pin 68 is moved inwardly therewith so as to move into the path of the shoulder 23 of plate 20, as will be apparent from consideration of Figures 1 and 2.

The extension 67 of arm 64 carries a forked portion 69 which cooperates with a switch blade 70. Switch blade 70 is adapted to be moved into engagement with either of two contacts 71 or 72 attached to downwardly extending contact carrying arms 73 and 74 respectively. In the position of knob 59 shown in the drawings, the extension 67 is in the position indicated in Figure 4 so that switch blade 70 is in engagement with contact 71. When the knob 59 is moved inwardly so as to thrust the pin 68 into the path of engagement of plate 20, the switch blade 70 is moved into engagement with contact 72. When the plate 20 is in the energized position, as shown in dotted lines in Figure 2, knob 59 cannot be moved fully inwardly because of the pin 68 engaging the surface of plate 20 between the curved shoulders 22 and 23. When this is the case the knob 59 can only be moved in sufficiently to move extension 67 forward enough to cause disengagement of switch blade 70 from contact 71 but not enough to cause engagement of the switch blade with contact 72. The purpose of this will be apparent from the description of the operation of my system.

Referring to Figure 7, the damper motor which has just been described is shown as embodied in a preferred form of a damper regulating system. In this figure a conventional furnace is designated by the reference numeral 80. This furnace is shown for the purposes of illustration as a warm air furnace, although it is to be understood that my invention is not to be so limited and that any suitable type of furnace may be employed. The furnace, as is customary, is provded with hot air ducts 81, a stack pipe 82, having a check damper 83 therein, and a draft damper 84. The draft damper 84 is connected through a chain 85 or other similar device to one end of the damper arm 35 and check damper 83 is similarly connected through a chain 86 with the other end of damper arm 35. Both chains are of sufficient length so that when the arm 35 is in its horizontal position both dampers are closed.

Associated with the furnace is a suitable limit control 87. This control may be of any conventional form and is shown for purposes of illustration as comprising a helical bimetallic element 88 which has one end fixed and is attached to a rod 89 at the other end, which rod is in turn operatively connected to a mercury switch 90 so that upon heating of the bimetallic element 88, the mercury switch 90 is rotated by rod 89. The mercury switch 90 has the usual mercury element 91 which is designed in the circuit closing position of the switch to bridge two contacts 92 and 93. As is customary with devices of this type, the limit switch is designed to interrupt the circuit controlled thereby when the temperature in the bonnet of the furnace rises above a predetermined value. Although the limit switch is shown as located in the bonnet of the furnace it may be located in any other suitable desirable point adjacent to the furnace and may, in certain cases, even be located at a point remote from the furnace.

A room thermostat 94 normally controls the operation of the damper motor. This thermostat, which may be of any conventional form, is shown as comprising a bimetallic element 95 having attached thereto a contact carrying arm 96 which is adapted to be engaged with two contacts 97 and 98. The portion of the contact arm 96 which engages with the contact 98 is less widely spaced therefrom than the portion of the contact arm 96 which engages with contact 97. Thus, upon a decrease in temperature which causes bimetallic element 95 to move to the left the contact arm will first be engaged with contact 98 and later with contact 97.

A step-down transformer 100 is employed to supply low voltage power for the operation of my control system. This transformer comprises a high voltage primary 101 and a low voltage secondary 102. The primary 101 is connected to line wires 103 and 104.

The motor 14 is shown in these drawings schematically, with the two field coils indicated by the reference numerals 105 and 106. The coil 105 is the holding coil previously referred to and the coil 106 is the lifting coil.

The other elements of the damper motor are indicated by the same reference characters as previously employed in describing the structure thereof and it is believed that in view of the previous description, the showing of this portion of Figure 7 will be obvious without further description.

In the position shown, the temperature of the room or other space to be heated is at or above the desired value. In other words, the thermostat is "satisfied". In this position, the motor of the damper motor is deenergized and the various elements of the damper motor are in the position shown in Figures 1 to 6. Upon the temperature of the space dropping below the desired value so that the thermostat "calls for heat", contact arm 96 is moved into engagement first with contact 98 and then with both contacts 97 and 98. No action takes place until the arm 96 is in engagement with both contacts 97 and 98. Upon this taking place, however, the following circuit for the motor will be established: From the left-hand terminal of secondary 102 through conductor 108, terminal 93, mercury 91, terminal 92, conductor 109, switch 75 blade 70, contact 71, conductor 110, contact 98, contact arm 96, contact 97, conductors 111, 112, 118 and 113, holding coil 105 and conductor 114 to the right-hand terminal of secondary 102. This causes energization of the motor and rotation of shaft 16. After a very slight initial rotation of shaft 16, the cam 37 is rotated sufficiently to allow switch arm 42 to effect engagement of contacts 48 and 49. When this takes place, the following holding circuit is established for the motor 14: From the left-hand end of secondary 102, through conductor 108, contact 93, mercury 91, contact 92, conductor 109, switch arm 70, contact 71, conductor 110, contact 98, contact arm 96, bimetallic element 95, conductor 116, contacts 49 and 48, switch blade 42, conductors 117, 112, 118 and 113, holding coil 105, and conductor 114 to the right-hand terminal of the secondary 102.

Almost simultaneously with, but very shortly after, the engagement of contacts 48 and 49 with the resultant establishment of the holding circuit for the motor 14, cam 38 is rotated sufficiently to permit switch arm 54 to effect engagement of contacts 55 and 56. Upon this taking place, the following circuit is established for the lifting coil 106: From the left-hand terminal of secondary 102, through conductor 108, contact 93, mercury 91, contact 92, conductor 109, switch blade 70, conductor 110, contact 98, contact arm 96, bitmetallic element 95, conductor 116, contacts 49 and 48, switch arm 42, conductors 117, 112 and 120, switch blade 54, contacts 55 and 56, conductor 121, lifting coil 106, conductor 122 and conductor 114 to the right side of secondary 102. It will be noted that the circuits just traced result in the coil 106 and the holding coil 105 being connected in parallel. As stated at the beginning of this paragraph, the engagement of contacts 55 and 56 takes place very shortly after the establishment of the holding circuit by reason of the engagement of contacts 48 and 49. This is desirable for the reason that until such holding circuit is established, a very slight deflection of the contact arm 96 to the right will interrupt the energizing circuit and it is undesirable that the lifting coil 106 carrying a comparatively large amount of current be connected into the circuit so long as this situation exists. As soon as the holding circuit is established, however, it is necessary for an appreciable temperature change to occur before the circuit is interrupted and there is, accordingly, an assurance that the motor will be allowed to operate through its complete cycle.

With both the lifting coil and the holding coil in the circuit, the shaft 16 is rotated against the action of spring 32 until such rotation is stopped by the curved shoulder 23 of plate 20 moving into engagement with the stop pin 27. Just before this takes place, however, contacts 55 and 56 are separated by the follower 57 of the switch blade 54 traversing the heel portion 53 of cam 38 and riding up on the toe portion of the cam. This interrupts the circuit to the lifting coil so that only the relatively weak holding coil remains energized.

In the new position of shaft 16, the damper arm 35 will be displaced 60 degrees from the position shown in Figure 7. In the new position the draft damper 84 will be open and the check damper 83 closed. This will result in a draft producing condition so that sooner or later the temperature of the space which is heated begins to rise. When the temperature of the space rises above the value for which the thermostat 95 is set the contact arm 96 will move away from first contact 97 and then contact 98. When the disengagement of contact arm 96 from contact 98 takes place, the circuits through both coils 105 and 106 will be interrupted and the motor will be deenergized. The spring 32 is now effective to rotate the shaft 16 back to the position shown in the drawings.

When it is desired to move the dampers to firing position, knob 59 is pressed inwardly. This causes the pin 68 attached to the arm 64 to be moved inwardly. If the various elements are in the position shown in the drawings; i. e. if the thermostat is satisfied and the dampers are in draft retarding position, then the knob 59 may be moved inwardly until pin 68 projects in the path of movement of plate 20. This inward movement of knob 59 causes sufficient movement of the arm 64 attached thereto to move the switch blade 70 from engagement with contact 71 into engagement with contact 72. This causes the following circuit to be established through the holding coil 105 of the motor: From the left-hand terminal of the secondary 102, through conductor 108, contact 93, mercury 91, contact 92, conductor 109, switch arm 70, contact 72, conductor 113, holding coil 105 and conductor 114 to the right-hand terminal of secondary 102. This causes the motor to be rotated with the result that switch arm 54 is allowed to move downwardly into engagement with contact 56 and to establish an energizing circuit for the lifting coil 106 as follows: from the left-hand end of secondary 102, through conductor 108, contact 93, mercury 91, contact 92, conductor 109, switch arm 70, contact 72, conductor 118, conductor 120, switch arm 54, contacts 55 and 56, conductor 121, lifting coil 106, conductors 122 and 114 to the right-hand terminal of secondary 102. The motor is then rotated upwardly against the action of the spring 32 until the movement thereof is terminated by the curved shoulder 23 of plate 20 engaging the pin 68. As will be apparent, the position of pin 68 is such that it causes the shaft 16 to be stopped in mid-position. This position is such that damper arm 35 is horizontal. As previously stated, when damper arm 35 is horizontal both dampers are closed as desired for firing.

The action just described is that which takes place when the thermostat is satisfied and the dampers are in draft retarding position. If it should so happen that the thermostat is calling for heat and the dampers are in draft producing condition when it is desired to move the same to mid-position, it is impossible to move the pin 68 into the path of the curved shoulder 23 of the plate 20 by reason of the fact that the pin abuts with the portion of the plate 20 between the curved shoulders 22 and 23 as will be obvious from the dotted line showing of Figure 2. When this happens, the arm 64 is moved inwardly just sufficiently to cause disengagement of the switch handle 70 from the contact 71 with the result that the circuit through the motor coils is broken. This causes the shaft 16 to be rotated in a counter-clockwise direction viewed from the right of Figure 1, by reason of the action of spring 32. The shaft will continue to rotate until the curved shoulder 23 has moved beyond the pin 68 so as to permit pin 68 to be moved inwardly still further. When this is done switch blade 70 moves into engagement with contact 72 and both the holding coil 105 and the lifting coil 106 are energized through the circuits traced in the previous paragraphs. The motor will then rotate upwardly until it is stalled by the curved shoulder 23 engaging the pin 68 as previously described. It is to be understood that the normal operation of the knob 59 in this case is that the operator will push the same inwardly as far as it will go and hold the same in until the plate 20 has rotated backwardly sufficiently to permit the pin 68 to be moved into the path of curved shoulder 23.

In either of the two last mentioned cases, where the knob 59 is moved inwardly to cause the dampers to move to mid-position, the operator needs merely pull outwardly on the knob 59 to restore the damper motor to thermostatic control. When this is done the motor will either continue to rotate the shaft 16 in a clockwise direction or the shaft 16 will rotate in a counterclockwise direction by reason of the spring 32 until the dampers are either in draft-producing or draft-retarding position, depending upon the position of the thermostat 94. In case, however, that the operator should neglect to withdraw knob 59 means are provided for preventing a dangerously high temperature being produced in the furnace. It will be noted that although the circuit through the motor windings established upon switch arm 70 being moved into engagement with contact 72 is independent of the thermostat 94 it is not independent of the limit switch. Thus, if the knob 59 should be left inwardly so that the dampers would be in mid-position, and if because of mild weather or for some other reason the limit control is set to open at a temperature which can be produced within the furnace with the dampers in mid-position, the limit switch will eventually open and cause deenergization of the motor windings. When this happens the force exerted upon pin 68 is removed and the knob 59 is moved outwardly by reason of spring 60, causing switch blade 70 to again be moved into engagement with contact 71. The motor will then be under control of the thermostat and as soon as the limit switch is closed by reason of the bonnet temperature of the furnace cooling down the damper motor will move the dampers to the position required by the position of the thermostat 94. If the limit switch is set at a higher temperature than is attained in the furnace with the dampers in mid-position no dangerous situation can arise since the fact that the temperature does not rise sufficiently to open the limit switch is an assurance that the temperature is not excessively high. While the operation of the limit switch has been described in connection with a case where the dampers are under manual control, it is to be understood that the limit switch functions in the normal manner to interrupt the motor circuit at any time that the furnace temperature rises above the value for which the limit switch it set.

It will be seen that I have provided a damper motor of the stalled motor type wherein manually controlled means are provided for causing the motor to move the dampers to a mid-position. At the same time, provision is made for returning the dampers to the control of the thermostat automatically in the event that the temperature in the furnace rises excessively. Moreover, I have accomplished these objects with a structure of relative simplicity, having a minimum number of moving parts.

While I have described a specific embodiment of my invention, it is to be understood that this is for purposes of illustration only and that my invention is to be limited only by the scope of the appended claims.

I claim as my invention:

1. In combination, a furnace, damper means therefor movable between draft retarding and draft producing positions, a damper regulating device, motor means for actuating said damper regulating device in reverse directions, means to limit the operation of said motor means so as to terminate the movement of said damper regulating device at draft retarding and draft producing positions, and further means comprising a stop manually movable to a position in which the stop is effective to terminate the operation of the motor at an intermediate position of said damper means, and a motor controlling member operative to cause movement of the motor means from either extreme position upon the movement of said last named stop.

2. In combination, a motor, a driven member, driving connections between said motor and said driven member, yieldable means to drive said member in a direction opposite to that of the movement imparted by said motor, means to terminate movement of said driven member at predetermined extreme positions, and means comprising a stop movable to a position in the path of the driven member to terminate movement of said driven member at an intermediate position, and motor controlling means operative upon movement of said last named stop to cause movement of said driven member by either said motor or said yieldable means to said intermediate position.

3. In a damper regulator, a motor, a damper actuator, driving connections between said motor and said damper actuator, yieldable means to drive said actuator in a direction opposite to that of the movement imparted by said motor, means to terminate movement of said damper actuator at predetermined extreme positions, and means comprising a stop movable to a position in the path of the damper actuator to terminate movement of said actuator at an intermediate position, and motor controlling means operative upon movement of said last named stop to cause movement of said damper member by either said motor or said yieldable means to said intermediate position.

4. In combination, a furnace, damper means therefor movable between draft retarding and draft producing positions, a damper regulating device, reversible motor means for actuating said damper regulating device in reverse directions to cause movement of said damper means between draft retarding and draft producing positions in accordance with the value of a controlling condition, manually operated means for modifying the action of said last named means to cause movement of said dampers to an intermediate position, and means responsive to the attainment of a predetermined condition within the furnace to cause said motor means to move said damper means to said draft retarding position.

5. In combination, a furnace, damper means therefor movable between draft retarding and draft producing positions, a condition responsive device, damper operating means, means including said condition responsive device for controlling the action of the damper operating means so as to cause movement of said damper means between draft retarding and draft producing positions, manually controlled means for causing said damper operating means to operate independently of said condition responsive device to move said damper means to an intermediate position, a second device responsive to a condition which may be attained in the furnace when the damper means is in an intermediate position, and means including said second device operative upon the attainment of the condition to which said device is responsive to restore said damper operating means to the control of said first condition responsive device.

6. In combination, a motor, a driven member, means for biasing said driven member in a direction opposite to that of the movement imparted to said driven member by said motor, means to terminate the movement of said driven member in one direction when driven by said motor and in the other direction when driven by said biasing means, switch means for controlling the operation of said motor and additional controlling means to cause movement of said driven member from either extreme position to an intermediate position and to terminate said movement at said intermediate position, said last named means comprising a stop movable into the path of a portion of said driven member.

7. In combination, a motor, a driven member, means for biasing said driven member in a direction opposite to that of the movement imparted to said driven member by said motor, means to terminate the movement of said driven member in one direction when driven by said motor and in the other direction when driven by said biasing means, switch means for controlling the operation of said motor and additional controlling means to cause movement of said driven member from either extreme position to an intermediate position and to terminate said movement at said intermediate position, said last named means comprising switching means to energize the motor if deenergized or to deenergize the same if energized and a stop movable into the path of a portion of said driven member.

8. In a damper motor, a motor, a damper actuating member driven by said motor, means for biasing said damper actuating member in a direction opposite to that of the movement imparted to said damper actuating member by said motor, means to terminate the movement of said damper actuating member in one direction when driven by said motor and in the other direction when driven by said biasing means, and means to cause movement of said damper actuating member from either extreme position to an intermediate firing position and to terminate said movement at said intermediate position, said last named means comprising a stop movable into the path of a portion of said damper actuating member.

9. In a damper motor, a motor, a damper actuating member driven by said motor, means for biasing said damper actuating member in a direction opposite to that of the movement imparted to said damper actuating member by said motor, means to terminate the movement of said damper actuating member in one direction when driven by said motor and in the other direction when driven by said biasing means, and means to cause movement of said damper actuating member from either extreme position to an intermediate firing position and to terminate said movement at said intermediate position, said last named means comprising switch means to energize the motor if deenergized or to deenergize the same if energized and a stop movable into the path of a portion of said damper actuating member.

10. In combination, a furnace, damper means therefor movable between draft retarding and draft producing positions, a condition responsive device, damper operating means, means including said condition responsive device for controlling the action of the damper operating means so as to cause movement of said damper means between draft retarding and draft producing positions, manually controlled means for causing said damper operating means to operate independently of said condition responsive device to move said damper means to a firing position, a second device responsive to a condition of the furnace which may be attained when the damper means is in firing position, and means including said second device operative upon the attainment of the condition to which the device is responsive to restore said damper operating means to the control of said first condition responsive device.

11. In combination, a motor, a driven member movable thereby between two positions, means responsive to energization of the motor for causing movement of said member from one of said positions towards the other position, means biasing said driven member towards said one position, stop means for interrupting movement of said driven member in an intermediate position, and means associated with the stop means and operative when the driven member is in one of its extreme positions for causing energization of said motor and movement of said driven member to said intermediate position.

12. In a system of the class described, a flow controlling member, motor means for causing movement of said flow controlling member between two extreme positions, stop means for terminating movement of said flow controlling member in a position intermediate said extreme positions, and means associated with the stop means and operative when the flow controlling member is in one of said extreme positions for causing said motor to move said flow controlling means from said extreme position past said intermediate position towards said other extreme position and then back to said intermediate position in which it is held by said stop means.

SYLVANUS C. SHIPLEY.